US012618395B1

(12) United States Patent
Ari

(10) Patent No.: US 12,618,395 B1
(45) Date of Patent: May 5, 2026

(54) ONSHORE ELECTRICITY GENERATION SYSTEM

(71) Applicant: Bayram Ari, Istanbul (TR)

(72) Inventor: Bayram Ari, Istanbul (TR)

( * ) Notice: Subject to any disclaimer, the term of this patent is extended or adjusted under 35 U.S.C. 154(b) by 0 days.

(21) Appl. No.: 19/223,129

(22) Filed: May 30, 2025

(51) Int. Cl.
    *F03G 4/00* (2006.01)
    *F03G 6/00* (2006.01)

(52) U.S. Cl.
    CPC ............. *F03G 4/037* (2021.08); *F03G 4/001* (2021.08); *F03G 6/108* (2021.08)

(58) Field of Classification Search
    CPC .......... F03G 4/037; F03G 4/035; F03G 4/033; F03G 4/029; F03G 4/001; F03G 6/108; F03G 6/071; F03G 6/067; F03G 6/005; F03G 7/045; F24T 50/00; F24T 10/10; F24T 10/30; F24T 10/40; F24T 10/50; F24T 10/00
    See application file for complete search history.

(56) References Cited

U.S. PATENT DOCUMENTS

| | | | | |
|---|---|---|---|---|
| 9,470,442 | B2 | 10/2016 | Williams | |
| 11,480,160 | B1 * | 10/2022 | Mokheimer | ............ F03G 4/001 |
| 12,123,406 | B2 * | 10/2024 | Arefi | ........................ F03G 4/033 |
| 12,454,482 | B2 * | 10/2025 | Moncarz | ................... C04B 7/02 |
| 12,487,010 | B2 * | 12/2025 | Johnson | ................. F24T 10/00 |
| 12,522,710 | B2 * | 1/2026 | Lindberg | ................. C08J 11/14 |
| 2020/0011573 | A1 * | 1/2020 | Graham | ................... F24T 10/17 |

FOREIGN PATENT DOCUMENTS

CN          103807907 A       5/2014

* cited by examiner

*Primary Examiner* — Dapinder Singh
(74) *Attorney, Agent, or Firm* — Bayramoglu Law Offices LLC

(57)          ABSTRACT

The provided is an electricity generation system which utilises both solar energy and magma energy to generate electricity. The electricity generation system includes a condenser containing refrigerant inside, a pump connected to the condenser, a heat exchanger connected with the pump, heater pipes, a compressor, an air filter II, an air filter I, cooler pipes, and a turbine.

3 Claims, 2 Drawing Sheets

ONSHORE ELECTRICITY GENERATION SYSTEM

TECHNICAL FIELD

The invention relates to an electricity generation system which utilises both solar energy and magma energy to generate electricity.

BACKGROUND

Technically, there are various energy sources such as geothermal, thermal, nuclear, natural gas, wind, solar, liquid nitrogen, fuel oil, diesel and wave. Facilities where electricity generation is realised using these energy sources have been established.

CN103807907A discloses a power generation and heating system using solar energy. The inventive system converts solar energy into electrical energy.

U.S. Pat. No. 9,470,442B2 discloses a method for generating and distributing electric power for localized use.

When the systems existing in the prior art were examined, it was necessary to develop the inventive electricity generation system that enables the generation of electricity by utilising both solar energy and magma energy.

SUMMARY

The object of the present invention is to develop an electricity generation system that enables the generation of electricity by utilising both solar energy and magma energy.

Another object of the present invention is to develop a modular electricity generation system that is not affected by changes in air temperature.

BRIEF DESCRIPTION OF THE DRAWINGS

The electricity generation system realised to achieve the objects of the present invention is shown in the accompanying figures.

Figures.

Figure 1:
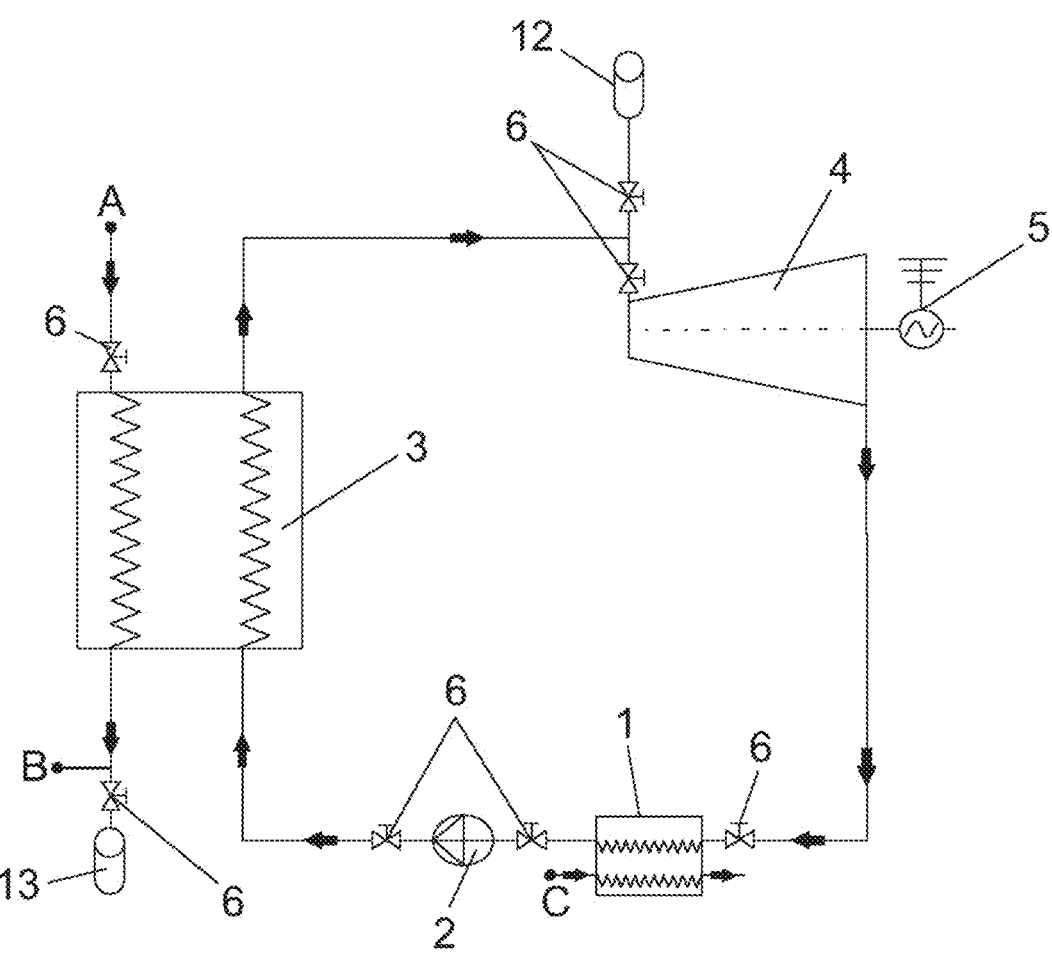
FIG. 1: A schematic view of the inventive electricity generation system without heating and cooling pipes.
Figure 2:
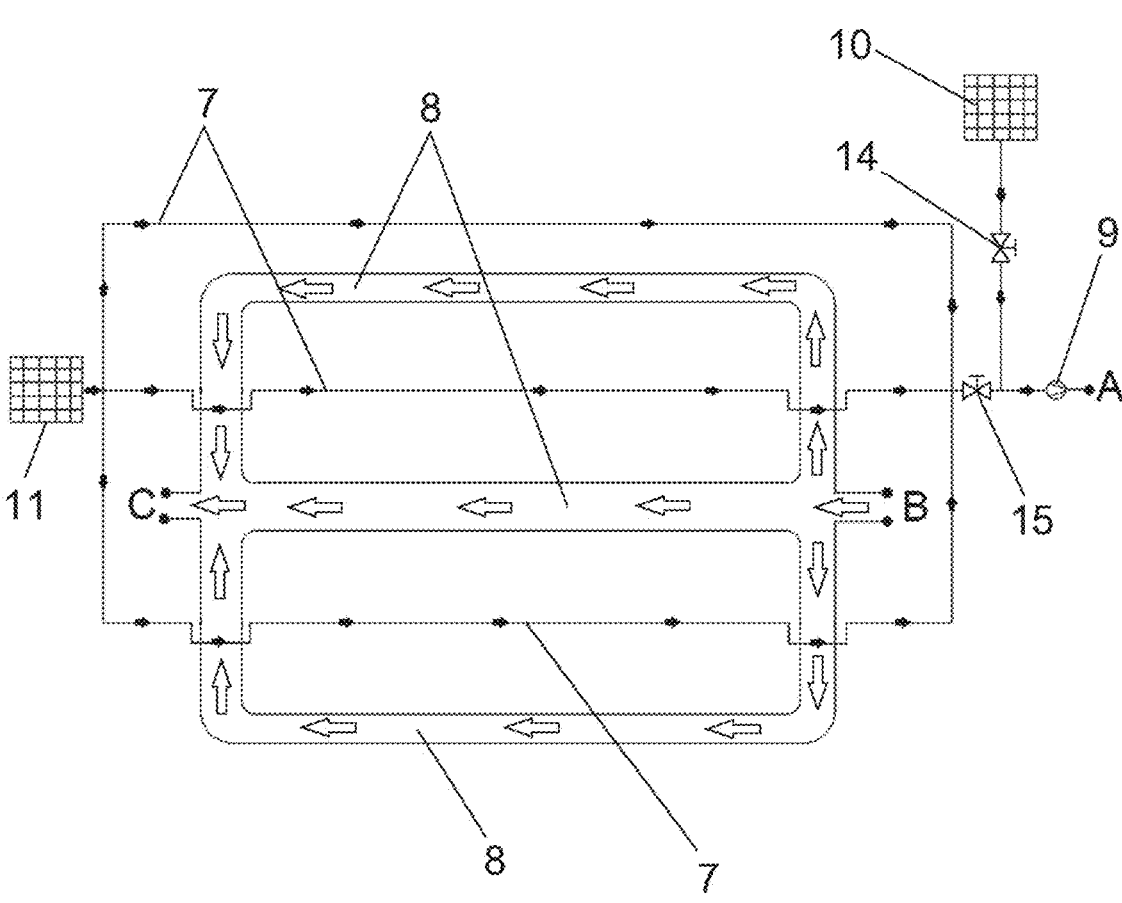
FIG. 2: A schematic view of the heater and cooler pipes in the electricity generation system of the invention.

The parts in the figures are numbered one by one and the equivalents of these numbers are given below.

1. Condenser
2. Pump
3. Heat exchanger
4. Turbine
5. Alternator
6. Valve I
7. Heater pipes
8. Cooler pipes
9. Compressor
10. Air filter I
11. Air filter II
12. First launch tube
13. Cooler starter tube
14. Valve II
15. Valve III

DETAILED DESCRIPTION OF THE EMBODIMENTS

An electricity generation system that utilizes both solar energy and magma energy to generate electricity, it comprises, condenser (1) which contains refrigerant inside, pump (2) connected to the condenser (1), which allows the refrigerant in the condenser (1) to be transmitted by increasing the pressure, heat exchanger (3) connected with pump (2), heater pipes (7) located under the ground and connected to the heat exchanger (3), which allow the coolant entering the heat exchanger (3) to be heated by air transmitted from the opposite direction, compressor (9) in connection with the heat exchanger (3), air filter II (11) connected with heater pipes (7), air filter I (10) positioned at the inlet of the compressor (9), cooler pipes (8) positioned under the ground, surrounded by perforated bricks and cooling the exhaust air from the heat exchanger (3), turbine (4) connected with heat exchanger (3), alternator (5) connected to the turbine (4) and generating electricity.

In the inventive system; firstly, an insulation layer is formed approximately 1.5-2 m below the ground surface. The insulation layer is formed with perforated bricks and polyethylene pipes.

In the insulation layer, a square-sectioned channel is formed with perforated bricks. Inside and in the center of this channel, there are polyethylene cooler pipes (8) that provide convective heat transfer. In addition, the perforated brick channel is wrapped with plaster and ruberoid against water infiltration from the outside. Thus, groundwater is protected in a way not to disturb the insulation.

After the insulation layer is formed, the cooler pipes (8) passing through the perforated brick channel and the heater pipes (7) located under the ground are connected to the heat exchanger (3).

In the operation of the inventive system in cold weather (when the air temperature is lower than the soil temperature); valve II (14) positioned in front of the air filter I (10) is in the closed position. In this case, the cold air sucked by the air filter II (11) is transmitted to the heater pipes (7) under the soil. The air in the heater pipes (7) is conveyed to the compressor (9). It can be considered as a situation where the system gets its energy from magma energy.

R134a refrigerant in the condenser (1) is transferred to the heat exchanger (3) with a pressure of approximately 400 kPA with the help of pump (2). The R134a entering the heat exchanger (3) is heated by the air coming from the heater pipes (7) and transmitted to the compressor (9) in the opposite direction. In this case, a superheated steam at subsoil temperature is obtained at the outlet of the heat exchanger (3). The superheated steam is transmitted to the turbine (4). The superheated steam reaching the turbine (4) rotates the turbine (4). As the turbine (4) rotates, electricity is generated by the alternator (5) connected to the turbine (4). This cycle continues continuously in the system.

R134a vapor from the turbine (4) enters the condenser (1). The vapor condensed in the condenser (1) is transferred to the heat exchanger (3) with the help of the pump (2).

In the inventive system, after the first cycle, the air coming out of the heat exchanger (3) is cooled by the cooler pipes (8) in the perforated brick ducts, which are transmitted to the underground, where the cooled air is transmitted to the condenser (1) and the condenser (1) is used to condense the R134a passing through it.

In the cooler pipes (8), the temperature of the air increases due to heat conduction (air collecting heat along the way). Therefore, in the condenser (1), there is a temperature difference between the condensing temperature of R134a refrigerant and the temperature of the cold air in the condenser.

In the operation of the inventive system in hot weather (when the air temperature is higher than the soil temperature), valve II (14) positioned in front of the air filter I (10) is turned on. In this case, valve III (15) located where the heater pipes (7) come to the surface is closed. The air sucked in through the air filter I (10) is delivered directly to the compressor (9). This can be considered as a case where atmospheric energy (solar energy) is used.

R134a refrigerant in the condenser (1) is transferred to the heat exchanger (3) with a pressure of approximately 400 kPa with the help of pump (2). The R134a entering the heat exchanger (3) is heated by the air in the opposite direction transmitted to the compressor (9). The air is compressed from the compressor (9) with a pressure of approximately 250 kPa. In this case, a superheated steam at subsoil temperature is obtained at the outlet of the heat exchanger (3). The superheated steam is transmitted to the turbine (4). The superheated steam reaching the turbine (4) rotates the turbine (4). As the turbine (4) rotates, electricity is generated by the alternator (5) connected to the turbine (4). This cycle continues continuously in the system.

In the inventive system, valve I (6) is positioned at the inlet and outlet of the condenser (1), pump (2) and turbine (4).

In addition, there is a first launch tube I (12) positioned at the inlet of the turbine (4) in order to start the first movement of the inventive system.

In the inventive system, when the system is intended to be operated in hot weather, the air temperature at these times is approximately +35° C. and the cooler pipes (8) are at subsoil temperature. In this case, the system is operated by opening valve I (6) located in front of the cooler starter tube (13).

The heater pipes (7) and cooler pipes (8) in the inventive system are placed inclined in a certain direction in case of water leakage. With the help of a pump, leaking water can be discharged from the lowest elevation. Thus, the operation of the system is not prevented without damaging the underground equipment.

The invention claimed is:

1. An electricity generation system that utilizes both solar energy and magma energy to generate electricity, comprising a condenser, wherein the condenser contains refrigerant inside, a pump connected to the condenser, wherein the pump allows the refrigerant in the condenser to be transmitted by increasing pressure, a heat exchanger connected with the pump, heater pipes located under ground and connected to the heat exchanger, wherein the heater pipes allow coolant entering the heat exchanger to be heated by air transmitted from opposite direction, a compressor in connection with the heat exchanger, a first air filter connected with the heater pipes, a second air filter positioned at an inlet of the compressor, cooler pipes positioned under the ground, surrounded by perforated bricks and cooling exhaust air from the heat exchanger, a turbine connected with the heat exchanger.

2. The electricity generation system according to claim 1, further comprising an alternator in connection with the turbine for generating electricity.

3. The electricity generation system according to claim 2, further comprising a first launch tube positioned at an inlet of the turbine and configured for starting a first movement of the electricity generation system.

\* \* \* \* \*